June 21, 1927.

J. E. YEAGER 1,633,203

GEARING FOR REAR AXLES OF AUTOS

Filed July 10, 1924

Inventor
John E. Yeager

By C. A. Snow & Co.

Attorneys

Patented June 21, 1927.

1,633,203

UNITED STATES PATENT OFFICE.

JOHN E. YEAGER, OF POYNTELLE, KENTUCKY.

GEARING FOR REAR AXLES OF AUTOS.

Application filed July 10, 1924. Serial No. 725,230.

This invention aims to provide a pinion and a ring gear for the differential mechanism of an automobile, the ring gear and the pinion being so constructed that the teeth thereof will not come out of mesh, the teeth of the pinion and the ring gear retaining their mesh even though the bearing for the shaft which carries the pinion should be in such a condition as not to restrain the pinion against movement longitudinally of the axis of the shaft and in a direction parallel to the ring gear.

It is within the province of the disclosure to improve generally and to enhance the utility of devices of that sort to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1:
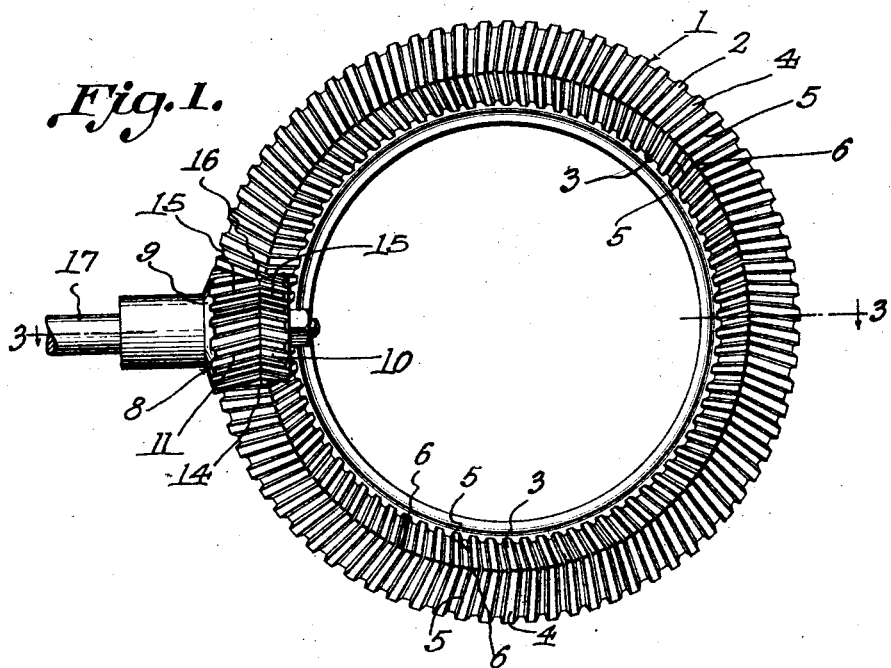
Figure 1 shows in elevation, a device embodying the invention.

In the drawing, there is shown a ring gear 1, two of such gears being disposed opposite to each other in the differential of a motor car. The ring gear 1 has teeth 2. Each tooth 2 comprises an inner member 3 and an outer member 4. The inner member 3 and the outer member 4 of each tooth 2 slant with respect to each other, circumferentially of the gear 1, as shown at 5, to define an apex 6. The inner member 3 and the outer member 4 of each tooth 2 slant, as shown at 7, with respect to each other, at an angle to the plane A—B of the gear 1, to apex 6.

The device includes a pinion 8 having teeth 9 meshing with the teeth 2 of the gear 1. Each tooth 9 of the pinion 8 comprises an inner member 10 and an outer member 11. The inner member 10 and the outer member 11 of each tooth 9 of the pinion 8 slant, as shown at 12, with respect to each other, toward the axis C—D of the pinion 8, the shaft which carries the pinion being designated by the numeral 17. The slant indicated at 12 forms an angle 14. The inner member 10 and the outer member 11 of each tooth 9 of the pinion 8 slant, as shown at 15, with respect to each other circumferentially of the pinion 8, to the apex 16 of said angle 14.

The device is further characterized by the fact that each outer member 4 of each tooth 2 of the gear 1 is longer than the inner member 3 thereof, the outer member 11 of each tooth 9 of the pinion 8 being longer than the inner member 10 thereof.

Figure 2:
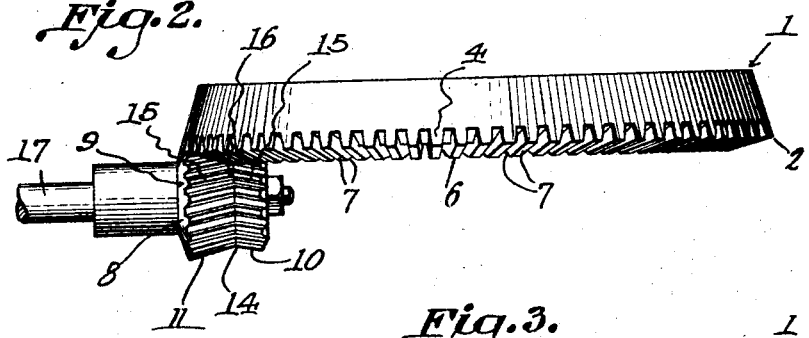
Figure 2 is a top plan.
Figure 3:
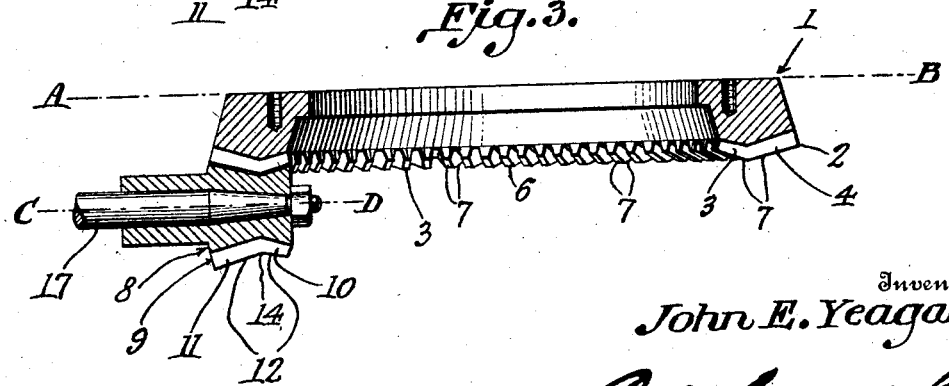
Figure 3 is a section taken on the line 3—3 of Figure 1.

The construction of the device is such that the pinion 8 will always remain in mesh with two oppositely disposed ring gears, like the parts 1, and, owing to the fact that the outer member 4 of each tooth 2 of the gear 1 is longer than the inner member 3 thereof, and because the outer member 11 of each tooth 9 of the pinion 8 is longer than the inner member 10 thereof, the device is securely adapted to remain in mesh against a rearward thrust, that is, against a thrust to the right in Figures 2 and 3.

There may be sufficient play between the teeth of the ring gear and the teeth of the pinion, so as to avoid any complications arising out of pitch cone problems, and, notwithstanding such play, the specific structure claimed will have a strength to resist wear, which cannot be attributed to devices heretofore known.

What is claimed is:—

In a mechanism of the sort specified, a ring gear having teeth, each tooth comprising outer and inner members, the outer member of each tooth of the gear being longer than the inner member thereof, the outer and inner members of each tooth slanting with respect to each other, circumferentially of the gear, to form an apex, the outer and inner members of each tooth slanting with respect to each other, at an angle to the plane of the gear, to said apex: and a pinion having teeth which mesh with the teeth of the ring gear, each tooth of the pinion comprising outer and inner members, the outer member of each tooth of the pinion being longer than the inner member thereof, the outer and inner members of each tooth of the pinion slanting with respect to each other toward the axis of the pinion to form an angle, the outer and inner members of each tooth of the pinion slanting with respect to each other circumferentially of the pinion to the apex of said angle.

In testimony that I claim the foregoing as my own, I have hereto affixed my signature.

JOHN E. YEAGER.